(12) United States Patent
Chai

(10) Patent No.: US 10,049,012 B1
(45) Date of Patent: Aug. 14, 2018

(54) TIME BASED CHECKPOINT RESTART

(71) Applicant: EMC Corporation, Hopkinton, MA (US)

(72) Inventor: Mu Chai, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 75 days.

(21) Appl. No.: 15/160,876

(22) Filed: May 20, 2016

Related U.S. Application Data

(63) Continuation of application No. 14/218,581, filed on Mar. 18, 2014, now Pat. No. 9,372,761.

(51) Int. Cl.
*G06F 11/00* (2006.01)
*G06F 11/14* (2006.01)

(52) U.S. Cl.
CPC ...... *G06F 11/1438* (2013.01); *G06F 11/1451* (2013.01); *G06F 2201/805* (2013.01); *G06F 2201/84* (2013.01)

(58) Field of Classification Search
CPC ............. G06F 11/1438; G06F 11/1451; G06F 11/1402; G06F 11/1423; G06F 11/1448; G06F 11/1469; G06F 11/1471; G06F 11/1458; G06F 11/0727; G06F 2201/805; G06F 2201/84
See application file for complete search history.

(56) References Cited

U.S. PATENT DOCUMENTS

| | | | | |
|---|---|---|---|---|
| 8,015,441 B2* | 9/2011 | Desai | ................. | G06F 11/1448 711/162 |
| 8,924,355 B1* | 12/2014 | Kundzich | ........... | G06F 11/1458 707/647 |
| 2008/0276123 A1* | 11/2008 | Sudhakar | ............ | G06F 11/1469 714/6.12 |
| 2008/0307019 A1* | 12/2008 | Weiss | ................... | G06F 11/1466 |
| 2009/0070626 A1* | 3/2009 | Chen | ..................... | G06F 9/4401 714/6.32 |
| 2011/0119525 A1* | 5/2011 | Muralimanohar | .. | G06F 11/1438 714/15 |
| 2011/0167235 A1* | 7/2011 | Inoue | .................... | G06F 3/0605 711/162 |

(Continued)

OTHER PUBLICATIONS

Office Action of U.S. Appl. No. 14/218,581, dated Oct. 7, 2015, filed Mar. 18, 2014.

(Continued)

*Primary Examiner* — Joseph D Manoskey
(74) *Attorney, Agent, or Firm* — Workman Nydegger

(57) ABSTRACT

In one example method, a group of directories is backed, and then a failure of an emitter is experienced. A respective saveset is created for each of several dynamic parallel save streams, where each saveset is associated with one or more emitters. Next, a path checkpoint 'P' is created using the smallest emitter, and a time checkpoint 'S' is created using an earliest savetime of all of the savesets. A retry is started using the time checkpoint 'S' and the path checkpoint 'P'. One or more items are identified for backup and then sent to a director to be backed up. Next, savesets are generated for the backed up items. Finally, the generated savesets are combined with the savesets of the dynamic parallel save streams to form a global image for all save streams.

15 Claims, 11 Drawing Sheets

(56) References Cited

U.S. PATENT DOCUMENTS

2011/0218967 A1* 9/2011 Sliger .................. G06F 12/00
　　　　　　　　　　　　　　　　　　　　　　　707/647

OTHER PUBLICATIONS

Notice of Allowance of U.S. Appl. No. 14/218,581, dated Mar. 9, 2016, filed Mar. 18, 2014.
Office Action of U.S. Appl. No. 14/254,531, dated Mar. 31, 2016, filed Apr. 16, 2014.
U.S. Appl. No. 14/254,531, dated Oct. 24, 2016, Notice of Allowance.

* cited by examiner

TIME BASED CHECKPOINT RESTART

RELATED APPLICATIONS

This application is a continuation, and hereby claims the benefit, of U.S. patent application Ser. No. 14/218,581, entitled TIME BASED CHECKPOINT RESTART, and filed Mar. 18, 2014. This application is also related to U.S. patent application Ser. No. 14/254,531, entitled NON-STREAM-BASED BACKUP RESTART, and filed Apr. 16, 2014. All of the aforementioned applications are incorporated herein in their respective entireties by this reference.

FIELD OF THE INVENTION

Embodiments of the present invention generally relate to the performance of backup and related processes. More particularly, embodiments of the invention relate to systems, hardware, computer-readable media, and methods for restarting a backup process when a transient failure has occurred.

BACKGROUND

Entities often generate and use data that is important in some way to their operations. This data can include, for example, business data, financial data, and personnel data. If this data were lost or compromised, the entity may realize significant adverse financial and other consequences. Accordingly, entities typically back up their important data so as to create a backup that can later be used in a data restore process if necessary. Backup processes are not without their problems however, and sometimes events such as transient failures occur that can interrupt the backup. Some attempts have been made to address circumstances such as these but, for various reasons, have not proven to be satisfactory.

Some backup processes, one example is the EMC NetWorker Checkpoint Restart (CPR), are save path-based. That is, when the backup restarts after the occurrence of a transient failure, the backup process picks up where it left off. However, this approach does not work well in all circumstances. For example, some backups, such as Windows VSS-based backups for example, require the entire backup to be made from the same snapshot.

Another problem with save path-based backups concerns the backup path itself. In particular, during the time that has elapsed between the failure and the backup restart, the paths already saved could have changed. Consequently, the changes to the path already saved will not be part of the resultant saveset produced by the backup process. This problem is particularly concerning where it comes to backups generated for use in bare metal restore processes (BMR). In these types of backups, the backup of every volume in a targeted set of volumes has to be repeated even if the backup of only a single volume in the targeted set of volumes fails. This approach to backup restart results in a significant waste of both time and backup space. It is for this reason that some path-based backup platforms, such as EMC NetWorker Checkpoint Restart, are disabled for All and DISASTER_RECOVERY.

Path-based backup processes experience other problems as well. For example, problems can occur when more than one save stream is employed for the backup. An example of such a multiple save stream process is a dynamic parallel save stream (DPSS), where multiple save sets are created for a savepoint. Conventional processes may not define how and where the retry should be picked up in the restart after a backup fail has occurred.

In light of the foregoing, it would be useful to be able to restart a backup, after a failure has occurred, without backing up data that was already backed up in the initial saveset that was created prior to the failure. As well, it would be useful to be able to combine the partial saveset created prior to failure with the partial saveset created after restart of the backup to form a complete backup image that would be substantially the same as, or identical to, a new saveset retaken at the time of the restart.

BRIEF DESCRIPTION OF THE DRAWINGS

In order to describe the manner in which at least some aspects of embodiments of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
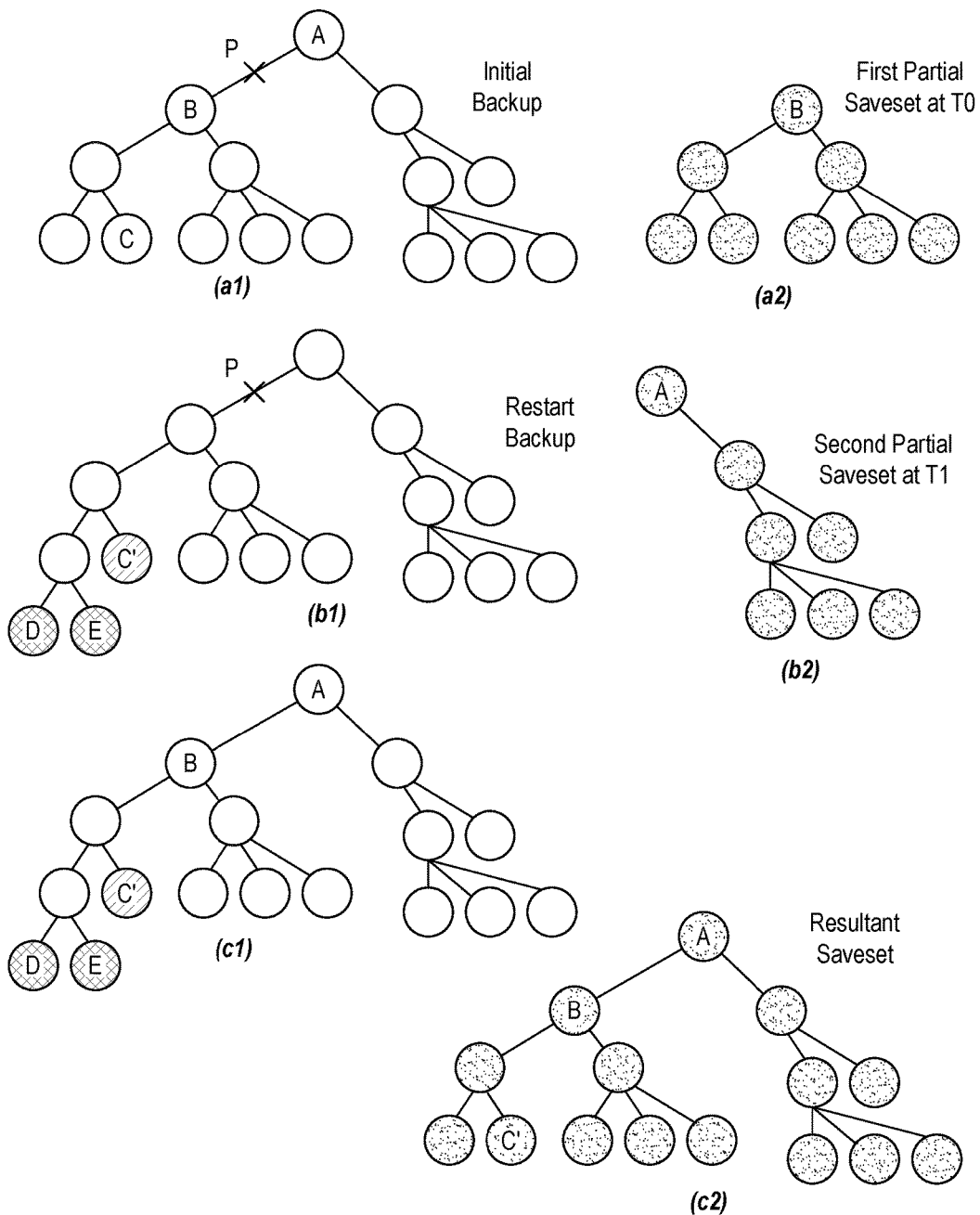
FIG. 1(a1) through FIG. 1(c2) collectively illustrate a hypothetical example of problems that may occur in connection with a path-based checkpoint restart process.

Embodiments of the present invention generally relate to the performance of backup and related processes. More particularly, embodiments of the invention relate to systems, hardware, computer-readable media, and methods for restarting a backup process when a transient failure has occurred.

In one example embodiment, a transient failure is detected during a backup process. As this transient failure occurs, a checkpoint is made indicating the save path where the backup failed, similar to the checkpoints that would be created in a path-based restore. Additionally however, the checkpoint includes the save time of the failed backup. This time checkpoint requires no additional information, and is simply derived from the save time associated with the failed partial saveset.

This checkpoint can then be used in a restart of the backup process. In particular, in the restart of the backup process, the save program uses those two pieces of information to avoid backing up the data already saved in the initial partial saveset, to create a new partial saveset which complements the initial partial saveset. The restarted backup uses the 'savetime' checkpoint as the 'asof' time for paths that have already been saved and the 'savetime' of the last successful backup as the 'asof' time for the paths that have not been saved. If there is no previous successful backup, a full backup is applied to the paths that have not been saved.

The initial partial saveset, and the new partial saveset created after the restart, together form a complete backup image that is, in effect, identical to a new saveset that would have been retaken at the time of the restart. Moreover, at least some embodiments of the invention can be applied to non-stream-based backups.

As the foregoing example illustrates, embodiments of the invention can yield a resultant saveset that accurately reflects the state of the system at the time of restart without having to backup the files already saved in the earlier failed attempt(s). As well, embodiments of the invention can be employed in a recursive manner for multiple consecutive failures occurring during a backup.

Moreover, embodiments of the invention can be used as part of, or in conjunction with, other processes. For example, at least some embodiments of the invention can be used with a bare metal restore (BMR) workflow to restart a BMR backup and create a new BMR image without having to back up the files already saved again. As another example, at least some embodiments of the invention can be used with dynamic parallel save stream (DPSS) workflows, where multiple save sets are created for a savepoint. Finally, while some embodiments of path-based CPR and time-based CPR, are employed with stream type backups, yet other embodiments of the invention are employed in association with non-stream based backups.

A. Problem Example-Path-Based Checkpoint Restart

Prior to a discussion of some example embodiments of the invention, it is useful to consider some problems that might be expected to be experienced in a path-based checkpoint restart (CPR) process. Accordingly, reference is first made to FIGS. 1(a1) through 1(c2) which illustrate a hypothetical situation in which a failure of some type occurs during a backup process. For the sake of simplicity, the backup levels for the example in FIGS. 1(a1) through 1(c2) are assumed to be full.

An initial backup process is illustrated in FIGS. 1(a1) and 1(a2), where the structure of 1(a1) represents a grouping of files to be backed up. As the backup proceeds from the bottom of the tree upwards, directories C and B are backed up. However, after directory B has been backed up but before directory A can be backed up, a failure 'X' occurs. As indicated in FIG. 1(a2), the backup program then creates a partial saveset at time $T_0$, namely, a saveset including all the files under directory 'B,' but not including directory 'A.' The backup program thus marks B as the path checkpoint for a subsequent restart of the backup process.

In the retry, that is, upon restart of the backup, and as indicated in FIG. 1(b1), the backup program commences walking the path beginning after checkpoint B and backs up the rest of the system. As indicated in FIG. 1(b2), the backup program then creates a partial saveset at time $T_1$, namely, a saveset including the files not in directory 'B.' This saveset, and the saveset created at time $T_0$, collectively form a full backup image for the system.

However, various changes may take place after creation of the first partial saveset. As indicated in the particular example of FIG. 1(b1), file C has been modified, and new files D and E have been added. However, because the backup process is path-based, and all files in directory B were previously backed up, the subsequent changes on that path are not captured in the first saveset, and because the second saveset only captured files from checkpoint B onward, those changes are not capture in the second saveset either.

Thus, the path-based CPR has missed those changes and produced a saveset that does not truly reflect the state of the file system at the time of the restart. If the omitted and/or changed files are system state files or other critical files, the backup may be unusable as a basis for a restore operation. This could be the case where, for example, the backup is a BMR backup. Even if there are no changes in the original files in directory 'B,' missing newly added files in directory B could lead to inconsistencies which may render a BMR backup unusable.

FIGS. 1(a1) through 1(c2) thus demonstrate that a path-based backup process may result in an incomplete saveset that fails to reflect changes that occurred subsequent to an interruption in the backup process. As disclosed herein, such as in the example of FIG. 3 discussed below, at least some embodiments of a time-based checkpoint recovery process may help to remedy these and/or other problems with path-based backup processes.

B. Aspects of Some Example Operating Environments

With the foregoing points in view, attention is directed now to aspects of some example operating environments. In this regard, it will be appreciated that embodiments of the invention can be practiced in a wide variety of environments and, accordingly, are not limited for use in connection with any particular environment or portion thereof.

Figure 2:
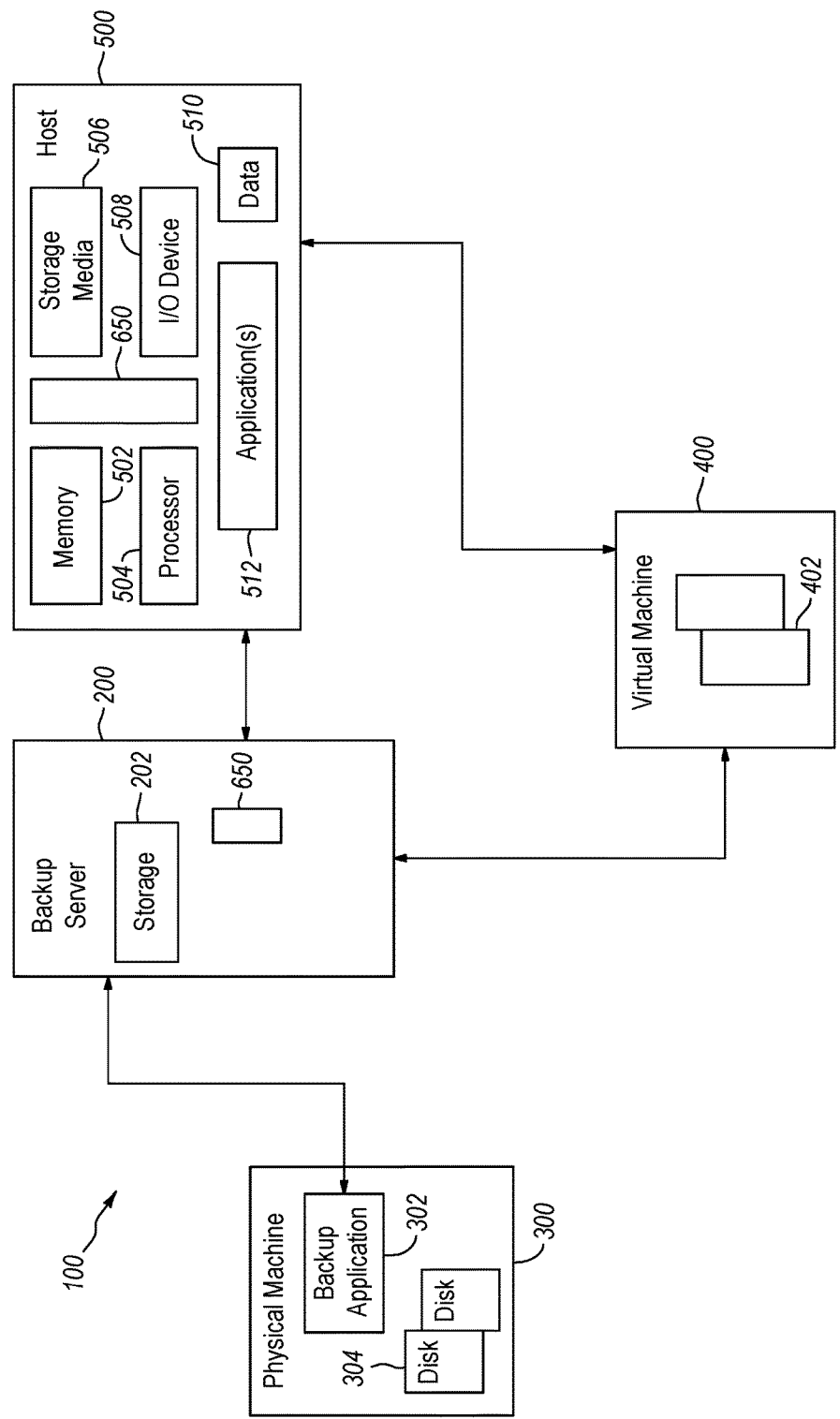
FIG. 2 discloses aspects of one example operating environment for one or more embodiments of the invention.

With particular reference now to FIG. 2, details are provided concerning one example of an operating environment that may be suitable for one or more embodiments of the invention. In FIG. 2, the example operating environment is denoted at 100 and may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. Moreover, any combination of the elements indicated in FIG. 2 may be implemented in a cloud or internet environment or other networked environment.

As indicated in FIG. 2, the example environment 100 includes a backup server 200 configured for communication with one or more clients 300, and one or more target machines 400. In general, backups created in connection with the backup server 200 can be restored to the client 300 and/or the target machine 400. The backup server 200, client 300 and/or target machine 400 may be physical machines, virtual machines, or any other suitable type of device. Additionally, one or more hosts 500 may be present in the operating environment 100.

With particular reference first to the backup server 200 and the client 300, the backup server 200 generally operates to create, or cause the creation of, one or more backups of data that is resident at the client 300. In some implementations, the backup server 200 is an EMC Corp. AVAMAR server or NetWorker server, although the scope of the invention is not limited to those example servers. The backup server 200 operates in conjunction with a backup application 302, which is a data de-duplication application in some embodiments, of the client 300 to backup data residing on storage media 304, such as disks for example, of the client 300. The save programs disclosed herein are example embodiments of a backup application. The backups thus created, which comprise de-duplicated backups in some embodiments, are stored on the storage media 202 of the backup server 200. The backups may be restored to the client 300 and/or to storage media 402 of the target machine 400, and/or to any other machines.

As noted above, the environment 100 may include one or more hosts 500. The number of hosts 500 in the environment 100 can vary, and the hosts can be of different types. In one example, one or more hosts 500 may all be part of the same network or associated with the same entity. The one or more hosts 500 can include, by way of example only, servers (e.g., a file server, an email server), computers (e.g., desktop computers, laptop computers, tablet devices, smartphones), virtual machines, databases, or any combination thereof. Each of the one or more hosts 500 can be associated with its own data. As well, a host 500 may generally be any device that includes one or more applications which require read-write access to a backup, such as the backups residing at the backup server 200. As such, the host 500 or any other device that requires read-write access to 'read only' data, which may or may not be backup data, may transmit both read and write requests concerning that 'read only' data.

In the example of FIG. 2, the host 500 is a machine, such as a computing device, that includes a memory 502, one or more processors 504, storage media 506, and I/O device 508, data storage 510. As well, one or more applications 512 are provided that comprise executable instructions. One or more of the target machine 400, client 300 and backup server 200 may likewise include any one or more of the aforementioned elements of example host 500, in any combination.

C. Aspects of Example Time-Based CPR Processes

Figure 3:
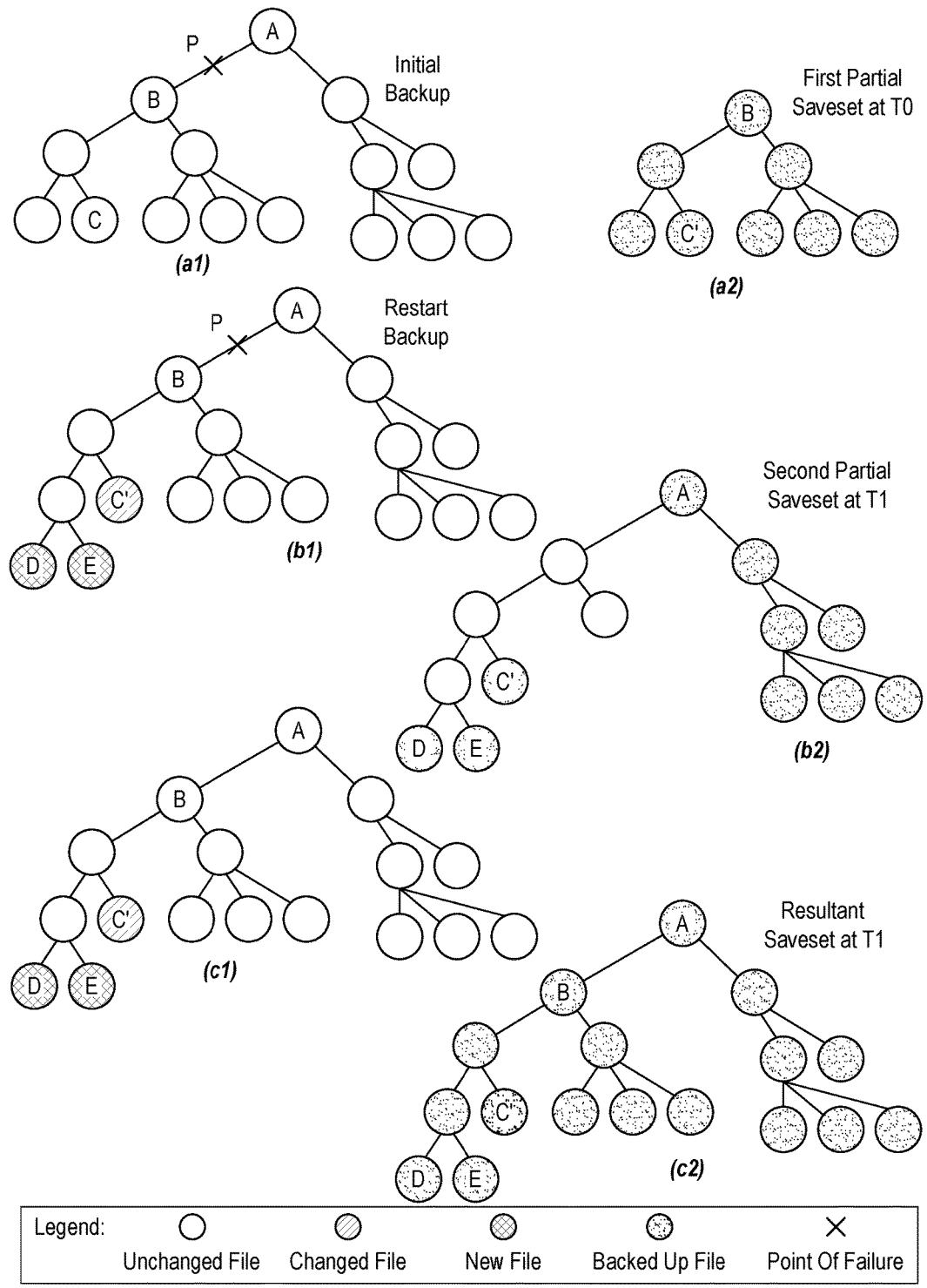
FIG. 3(a1) through FIG. 3(c2) collectively illustrate an example of a time-based checkpoint restart process.

With attention now to FIG. 3, details are provided concerning aspects of embodiments of a time-based checkpoint restart (CPR) process. Such embodiments may be especially well suited for circumstances where the failure that occurs during backup is a transient failure, that is, a failure that is unlikely to reoccur. One example of such a failure is a timeout that may be caused by high network traffic volumes. More generally, transient failures include any failure that is temporary in nature. Some of such transient failures may even be self-correcting. When employed in connection with transient failure circumstances, embodiments of the invention can provide particularly good performance when the save program traverses the file system in a deterministic manner, that is, the save program traverses the file system the same way during the retry as it did prior to the occurrence of the failure. In some instances, the save program may traverse the file system depth first. Of course, the save program may traverse the file system in any number of ways, and the scope of the invention is not limited to any particular approach.

As noted earlier, FIG. 3 describes aspects of an example embodiment of a time-based CPR. For the sake of simplicity, the backup levels for the example in FIGS. 3(a1) through 3(c2) are assumed to be full. As well, it should be noted that while the point of failure for a save path P may be somewhat comparable with the checkpoint defined in a path-based CPR, the checkpoint is the last committed file for the saveset and may not necessarily be the same as file P.

With particular reference now to FIGS. 3(a1) and 3(a2), a backup process fails at the save point B, yielding a partial saveset as shown in FIG. 3(a2). In contrast with a path-based CPR however, the save program does not only mark B as the checkpoint for the restart, but also marks the savetime $T_0$ of the first partial saveset as the time checkpoint for its restart.

In the example retry illustrated in FIG. 3(b1) and FIG. 3(b2), the save program walks the entire file system again. However, when walking the subdirectories\files under B, the save program performs an incremental backup of directory B, rather than a full backup of directory B. Thus, both the walk and backup can be performed relatively quickly. The incremental backup is based upon use of the savetime $T_0$ of the first saveset as its 'asof' time. This can be readily accomplished, for example, by applying an asm (assembler)-directive, and/or other suitable commands. In any event, changed file C' and new files D and E will be picked up by the incremental backup and included in the second partial saveset. It should be noted that as used herein, the 'asof' time refers to a defined point in time as of which one or more directories, files or portions thereof were successfully backed up.

After the save program has traversed the file system outside of directory B, the save program will revert to a full backup mode for the rest of the file system that is to be backed up. The incremental backup and full backup portions of the restart together form a second partial saveset. That is, combining the two partial savesets produces a resultant saveset at $T_1$ which is identical to a brand new full backup that would have been taken at $T_1$. See, e.g., FIGS. 3 (c1) and (c2). It should be noted that the resultant saveset refers to a logical configuration and, as such, does not require that the partial savesets be physically consolidated into one physical saveset, although that could be done.

With continued reference to FIGS. 3(a1) through 3(c2), it will be appreciated that embodiments of the invention can be employed in circumstances where the initial backup process, that is, the backup process during which the failure occurred, is an incremental backup rather than a full backup. In such situations, the restart and backup can be performed by using the savetime $T_0$ of the first partial backup as the 'asof' time for paths under directory B, and the savetime of the last successful backup as the 'asof' time for the paths outside directory B.

It should be noted that while various example embodiments disclosed herein address the backup of a file system, the scope of the invention is not so limited. For example, embodiments of the invention may be employed in connection with the backup of any one or more of partial file systems, directories, sub-directories, partial directories, individual objects such as files, or any other grouping of data that is to be backed up.

D. Aspects of Example Methods for Time-Based CPR

Figure 4:
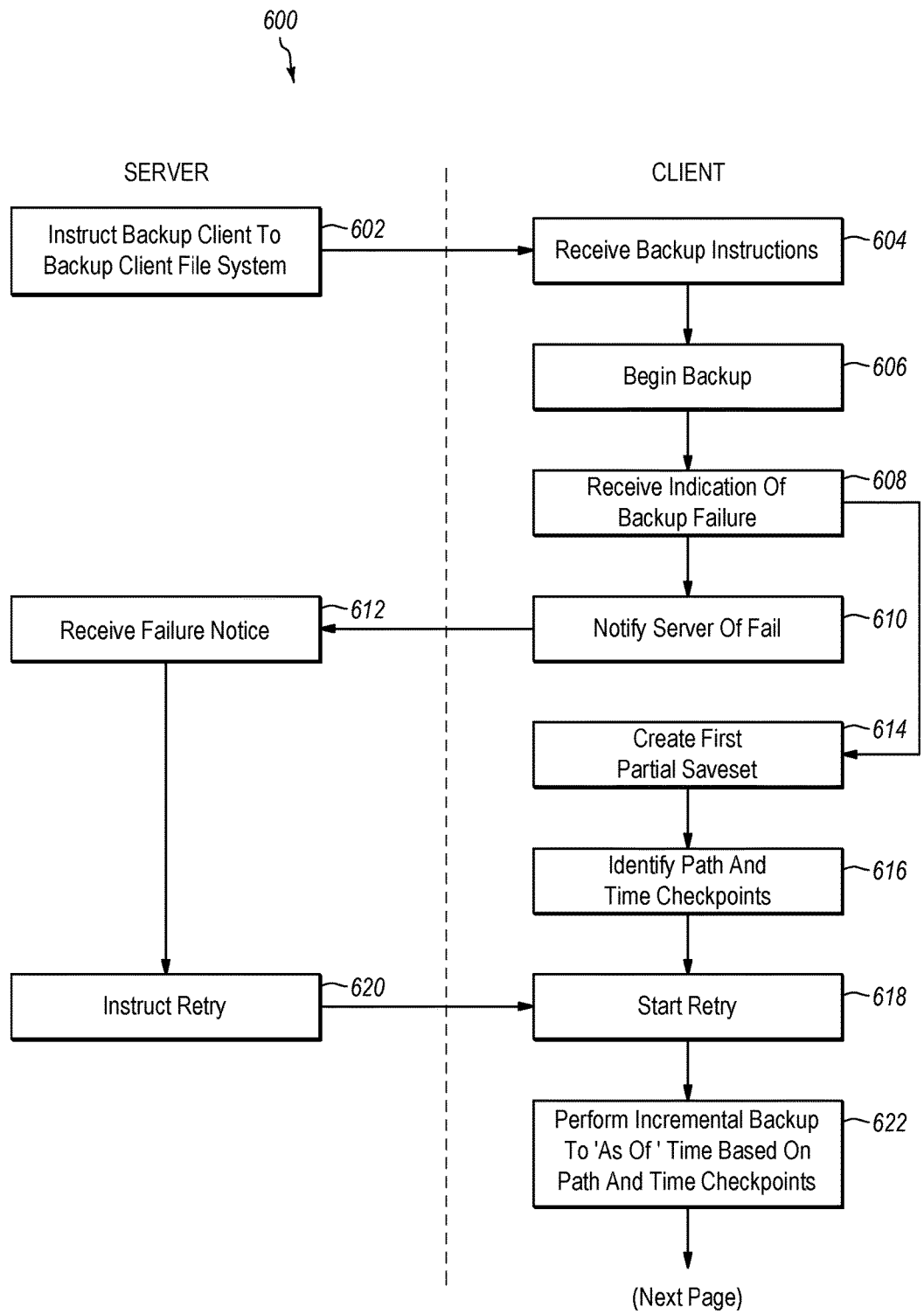
FIG. 4 is a flow diagram disclosing aspects of a method of time-based CPR.
Figure 4:
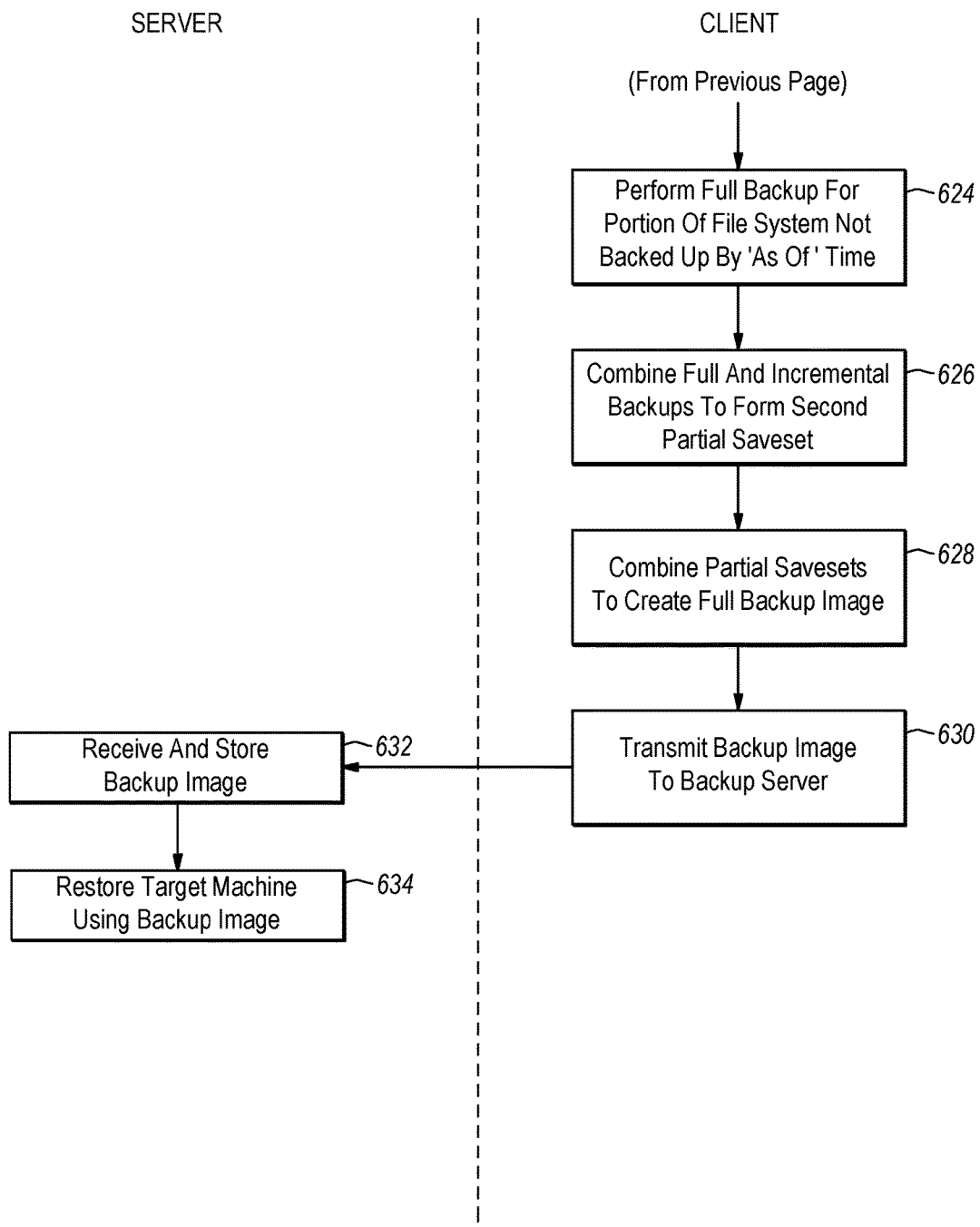

With continuing reference to FIG. 3, and directing attention now to FIG. 4 as well, details are provided concerning an example embodiment of a method of time-based check point restart, where the example embodiment is denoted generally at 600. As indicated in FIG. 4, the method 600 is performed in a client-server environment, although that is not necessarily required and other embodiments of a method of time-based check point restart can be performed in other environments.

The method 600 begins at 602 where a server, such as a backup server for example, instructs a backup client to back up all, or part, of a client machine. At 604, the backup client on the client machine receives the instructions transmitted by the backup server and, at 606, the backup client begins the instructed backup.

As noted elsewhere herein, failures, which may be transient, can sometimes occur during a backup process. Accordingly, the backup client may receive 608 an indication that some type of failure has occurred and, at 610, the server may be notified of the failure. At 612, the server receives the failure notice. At 614, which may occur at about the same time as 610, or at a different time, the backup client creates a first partial saveset that includes all the data that was backed up prior to occurrence of the failure.

At about the same time, or at a different time, as 614, the backup client identifies 616 both a path checkpoint and a time checkpoint associated with the first partial saveset. With reference to the illustrative example of FIG. 3, the path checkpoint may be a checkpoint indicating that all the data up to, and including, directory B was backed up prior to the failure. As noted elsewhere herein, and discussed in more detail below, the path checkpoint also defines the boundary between the incremental and full back up processes to be performed during the retry. That is, the incremental backup will be performed on the file system included in directory B, and a full backup will be performed on elements of the file system not included in directory B. With continued reference to 616, the identified time checkpoint is an 'asof' time associated with the first partial saveset. This 'asof' time indicates a defined point in time as of which the contents of the first partial saveset were fully backed up.

Once the parameters of the retry, namely, the path checkpoint and time checkpoint, are determined, a retry can be started 618. The server may, optionally, instruct 620 the backup client to retry the backup. Such instructions may be transmitted after the passage of a predetermined time period, or based upon any other criteria. In other instances, the backup client may begin the retry automatically and/or without requiring specific instructions from the server. For example, the backup client may begin the retry after the passage of a predetermined time period, or after receipt of an indication that the failure has been cleared, or based on any other criteria.

In any event, the retry is commenced 618 and the method 600 advances to 622 where an incremental backup is performed on data that was fully backed up as of the 'asof' time. By performing this incremental backup, any changes that occurred after the failure, to the data reflected in the first partial saveset, can be captured. This approach may thus avoid the problem, associated with backups that are path-based only, of creating a backup image that does not accurately capture the state of the file system that was backed up. As well, because 622 is an incremental backup, this portion of method 600 may proceed relatively quickly, even if it is the case that the entire file structure up to the path checkpoint is reexamined during the retry.

After the incremental backup has been performed 622 up to the path checkpoint, the method 600 advances to 624 where a full backup is performed with respect to the portion of the file system not backed up as of the 'asof' time. This full backup, and the incremental backup generated at 622 can then be combined to form 626 a second partial saveset.

The second partial saveset is then combined with the first partial saveset to create 628 a full backup image of the file system that accurately reflects the state of the file system. The full backup image can then be transmitted 630 from the client to the server. At 632, the server receives the full backup image from the client and stores the backup image, either locally at the server or at a remote location. When called upon to do so, the server can restore 634 a target machine, which may or may not be the client where the backup image was created, using the backup image.

Figure 5:
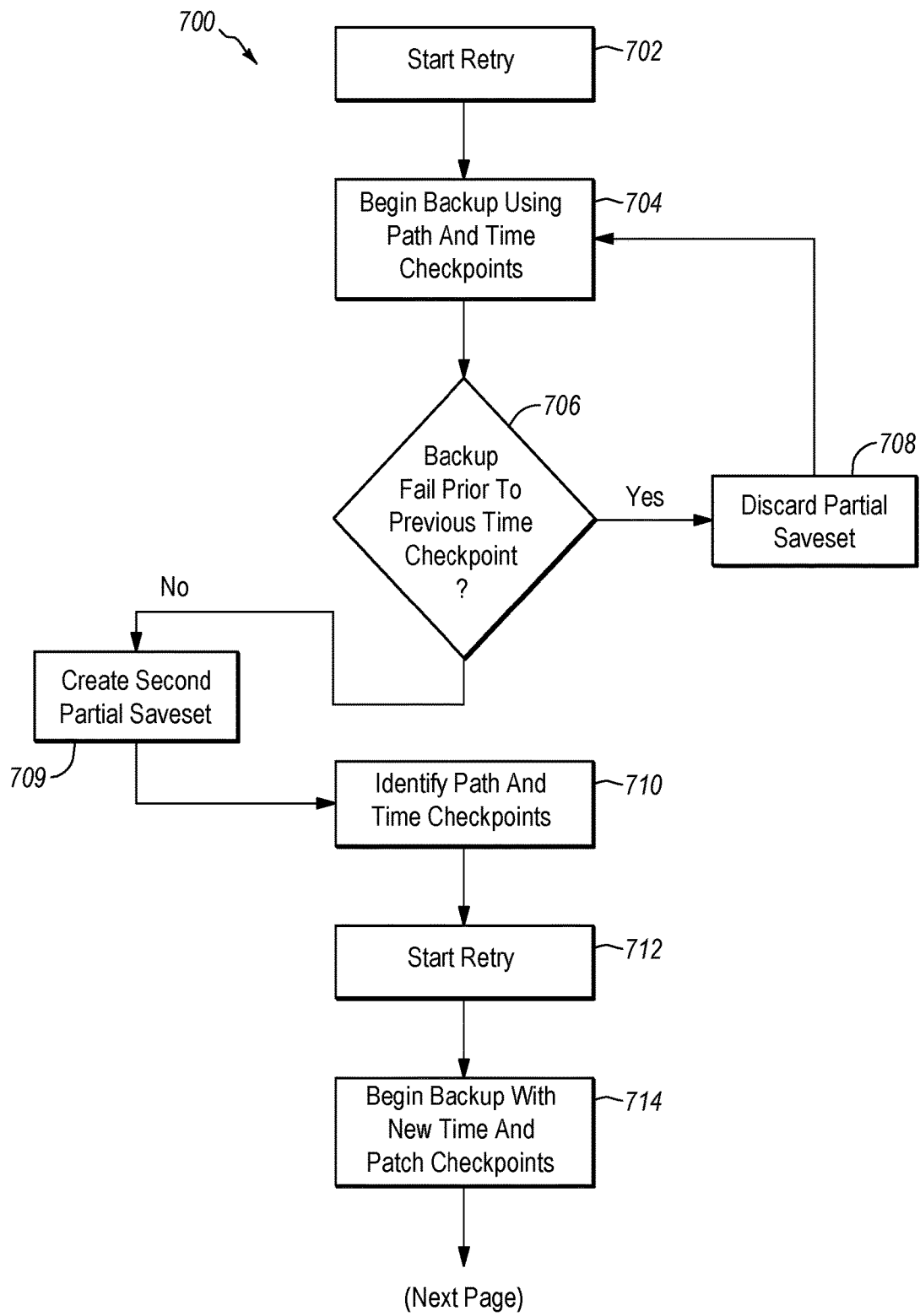
FIG. 5 is a flow diagram disclosing aspects of a time-based CPR that is recursively applied.
Figure 5:
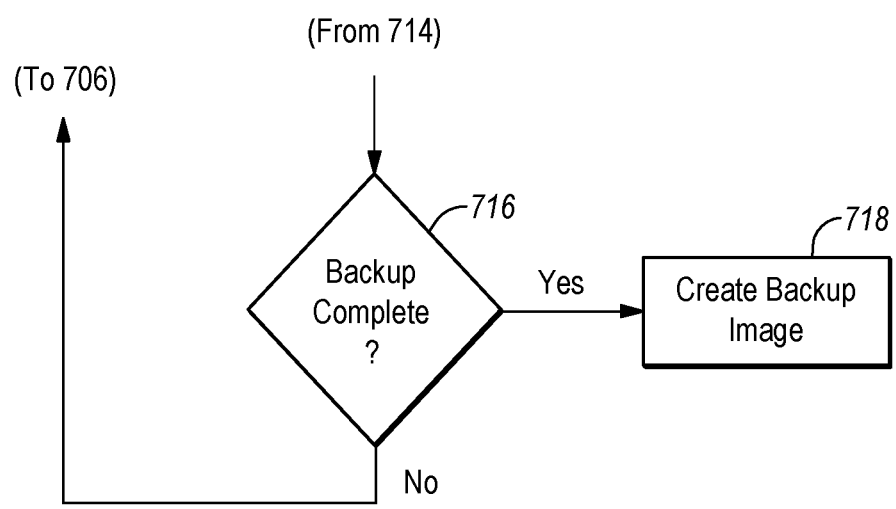
Figure 6A:
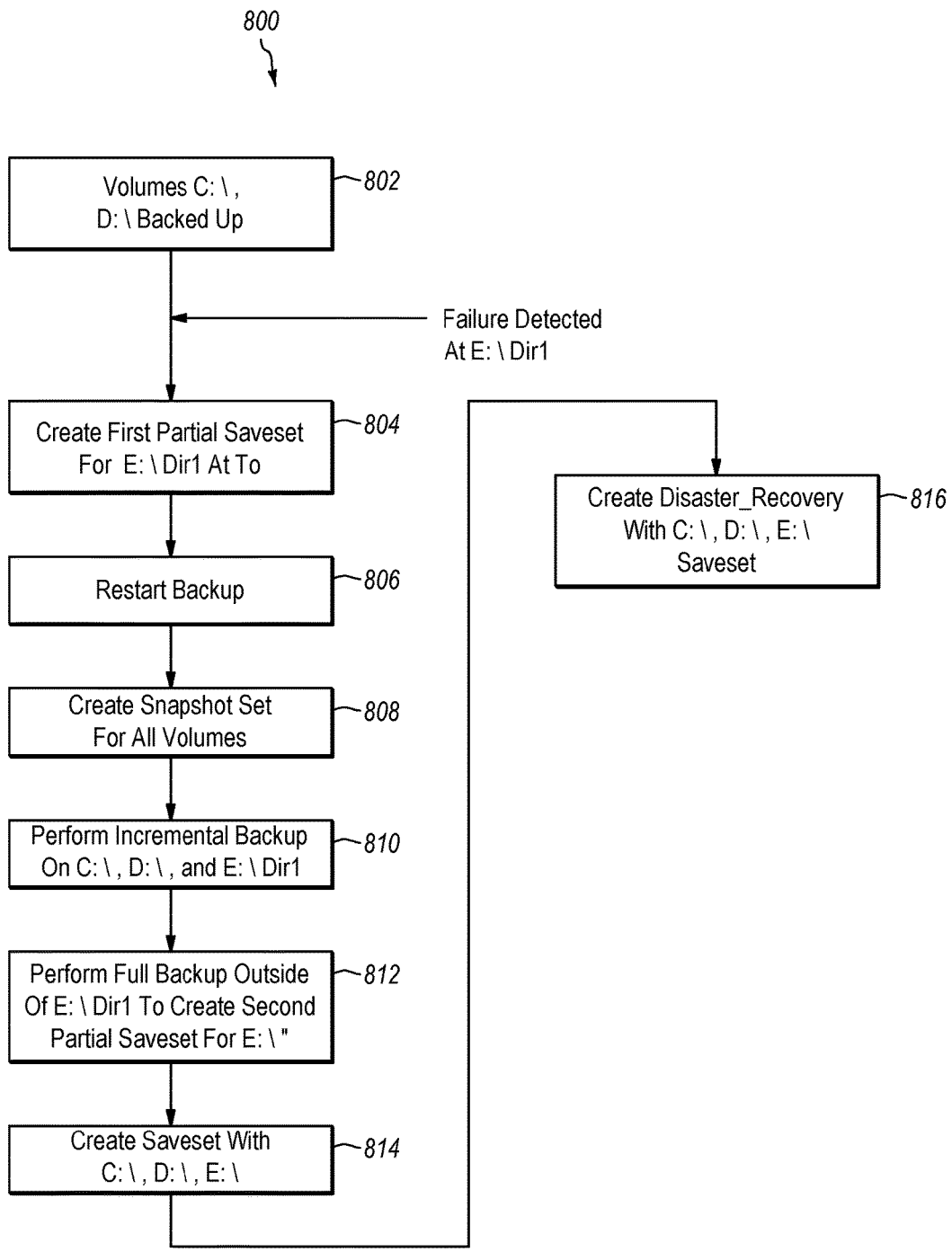
FIG. 6a is a flow diagram disclosing aspects of a time-based CPR applied in a BMR context.
Figure 6B:
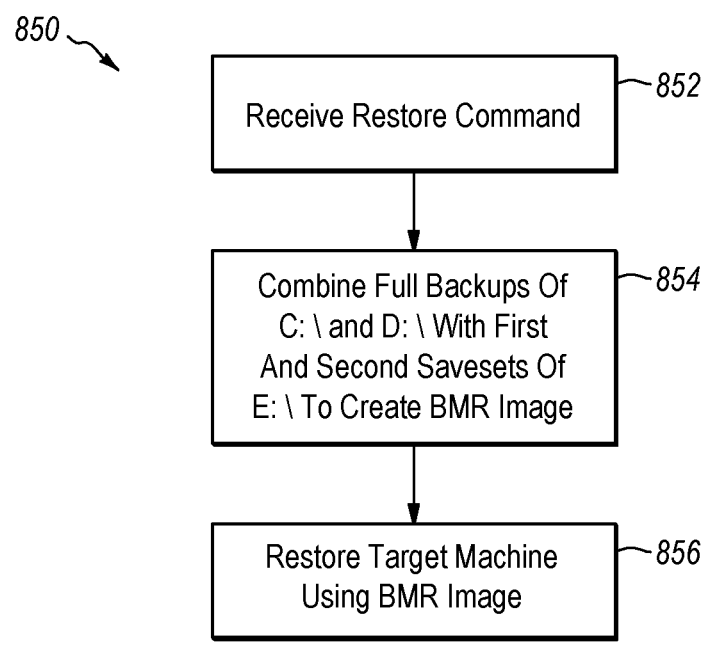
FIG. 6b is a flow diagram disclosing aspects of a restore method using a BMR backup.
Figure 7:
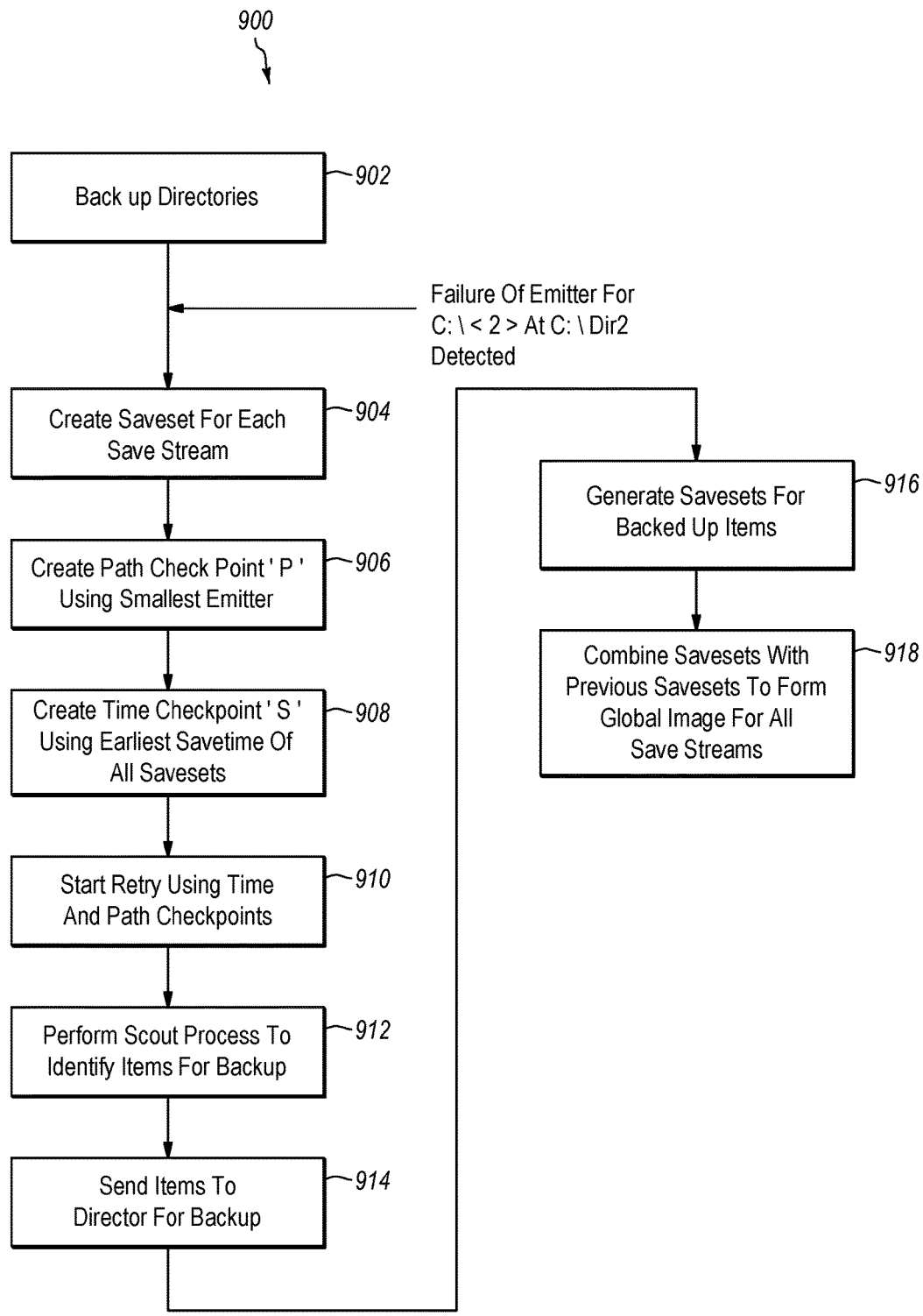
FIG. 7 is a flow diagram disclosing aspects of a time-based CPR applied in a DPSS context.

With attention now to FIGS. 5-7, details are provided concerning further aspects of methods for time-based CPR as applied in various contexts. Directing attention first to FIG. 5, the method 700 concerns recursive application of a time-based CPR, such as may be useful in circumstances where multiple failures occur during a backup process.

The method 700 may be similar, or identical, to the method 600 up to, and including, commencement of a retry 618 using the time and path checkpoints. This first partial saveset can be denoted, for example, as $S_0$ and having a savetime $T_0$ and failure path $P_0$. At 702, a retry is commenced and at 704 a backup is begun using the savetime $T_0$ and failure path $P_0$. At some point during the backup, a failure at failure path $P_1$ may occur and the method 700 may proceed differently depending upon the position of the failure. Thus, a decision point 706 is reached where an inquiry is made as to the position of the backup failure. If failure path $P_1$ is 'below' failure path $P_0$, in the file system that is (see, e.g., FIG. 3), the partial saveset created during the backup is discarded 708 since the saveset made above failure path $P_0$ already includes the data of the partial saveset. The method 700 then returns to 704 where the backup is restarted. On the other hand, if the backup failure is 'above' failure path $P_0$, a second partial saveset is created 709 and path and time checkpoints $P_1$ and $T_1$ for the second partial saveset are identified 710.

A retry is then commenced 712 and a backup begun 714 using the path and time checkpoints of the second partial saveset. At decision point 716, a determination is made whether or not the backup is completed. If so, a backup image is created 718 by combining all of the partial savesets to form a resultant saveset. If the backup is not completed, such as due to a failure of some type, the method returns to 706 and repeats until a backup is completed.

As the example of FIG. 5 illustrates, embodiments of the invention include recursive application of a time-based CPR until such time as a complete backup has been performed. This approach may be particularly useful where there is a possibility that multiple failures may occur during a backup process.

It should be apparent from the discussion of FIG. 5 and related Figures that the resultant saveset S will be the sum of $S_0, S_1, \ldots S_n$, where 'n' is the number of times that the backup has successfully restarted. In this regard, a successful restart is defined as the failure path $P_m > P_{m-1}$, that is, where a given restart associated with failure path Pm progressed further than the immediately preceding restart associated with failure path $P_{m-1}$.

Turning now to FIG. 6a, details are provided concerning further aspects of methods for time-based CPR as applied in various contexts. In FIG. 6, the method 800 concerns application of a time-based CPR to the creation of a bare metal restore (BMR) image that is identical to a new full BMR backup. As demonstrated by the example method 800 of FIG. 6a, embodiments of the invention may be particularly useful in avoiding the need to back up each and every volume after a BMR backup failure has occurred. For example, the method 800 may enable reuse of critical volumes already backed up, and use a partial saveset for the failed volume(s) to create a BMR image that is equivalent to a brand new BMR backup.

Except as noted below, the method 800 indicated in FIG. 6a may be similar, or identical, to the method 700. The method 800 may be performed in whole or in part by a save program, such as those disclosed herein. In the example of FIG. 6a, it is assumed that a BMR backup is at a full level. The volumes C:\,D:\ and E:\ are critical volumes on a system. At 802, the initial backup, volumes C:\ and D:\ were backed up successfully. Subsequent to that backup, a backup failure is detected at E:\ Dir1. A first partial saveset is then created 804 for E:\ Dir1.

A retry is then begun, and the backup restarted 806. The restart can be performed automatically, performed in response to a server command, or initiated in any other suitable manner. After the restart of the backup, a snapshot set is created 808 for all of the critical volumes. An incremental backup is then performed 810 with respect to the fully backed up volumes C:\,D:\ and E:\ Dir1. For volumes, or portions of volumes such as the volume outside of E:\ Dir1, not already backed up, a full backup is performed 812. This backup at 812 results in the formation of a second partial saveset for E:\. A saveset is then created 814 that includes C:\, D:\ and E:\. Finally, this saveset is then used as a basis for creating 816 DISASTER_RECOVERY. As explained below in the discussion of FIG. 6b, this saveset can be used in the restoration of a target machine.

With attention now to FIG. 6b, a restore method 850 is disclosed that commences at 852 where a restore command is received at a client, possibly from a server. The method 850 advances to 854 where the full backups of C:\ and D:\ are combined with the first and second savesets of E:\ to create a BMR image. A target machine can then be restored 856 using the BMR image.

Directing attention to FIG. 7, details are provided concerning a method 900 reflecting application of time-based CPR in a dynamic parallel save stream (DPSS) context. Similar to some other embodiments, the method 900 assumes that the file system will be traversed in a deterministic manner to identify which files will be backed up. This traversal may be carried out, for example, by a scout process, which may be in the form of program code located at a client, server, or other location(s).

As noted elsewhere herein, in a DPSS context, multiple save sets may be created for a savepoint. Each of the savesets may correspond to a respective save stream. For example, one savepoint is split into multiple sibling savesets, such as C:\ and <1>C:\, <2>C:\, for example. Each of the savesets may be associated with one or more emitters, that is, components that produce output. Example emitters include, but are not limited to, PDF, DOC, XLS, and HTML. Path-based CPR can be enabled for every emitter, or a subset of emitters.

With attention now to the method 900, at 902, a plurality of directories are backed up. At some point, a failure may be detected. For the purposes of illustration, a failure of emitter for <2>C:\ at C:Dir2 is assumed to be detected. After detection of the failure, a saveset is created 904 for each save stream.

A path checkpoint P is created 906, using the smallest emitter. For example, if the P check point for C:\ emitter is C:\ Dir2\file1 and for <1>C:\ is C:\Dir2|file2, C:\Dir2 will be the smallest and is used in this embodiment. Additionally, a time checkpoint S is created 908 using the earliest savetime of all the save sets. Use of the smallest emitter and/or earliest savetime can result in redundant saves for one or more files; however this approach may be desirable due to its greater safety relative to processes that use other emitters and/or savetimes.

Once the path and time checkpoints have been created, a retry is started 910 using the path and time checkpoints and the time-based CPR approach disclosed elsewhere herein, such as in FIG. 3 for example. As part of the retry, a scout process is performed 912 to identify items from the save streams for backup. The identified items are then sent 914 to a director for backup. The director may have the discretion to send the backup items to any emitters it sees fit since, in some embodiments at least, it is inconsequential which emitter those items are backed by.

At 916, savesets for the backed up items are generated. These newly generated savesets are then combined 918 with the previously generated savesets at 904 to form a global backup image for all of the save streams. That is, the resulting savesets would be the global combination for the two sets of sibling savesets C:\, <1>C:\ and <2>C:\. This global backup image can then be used to restore one or more target machines.

Figure 8:
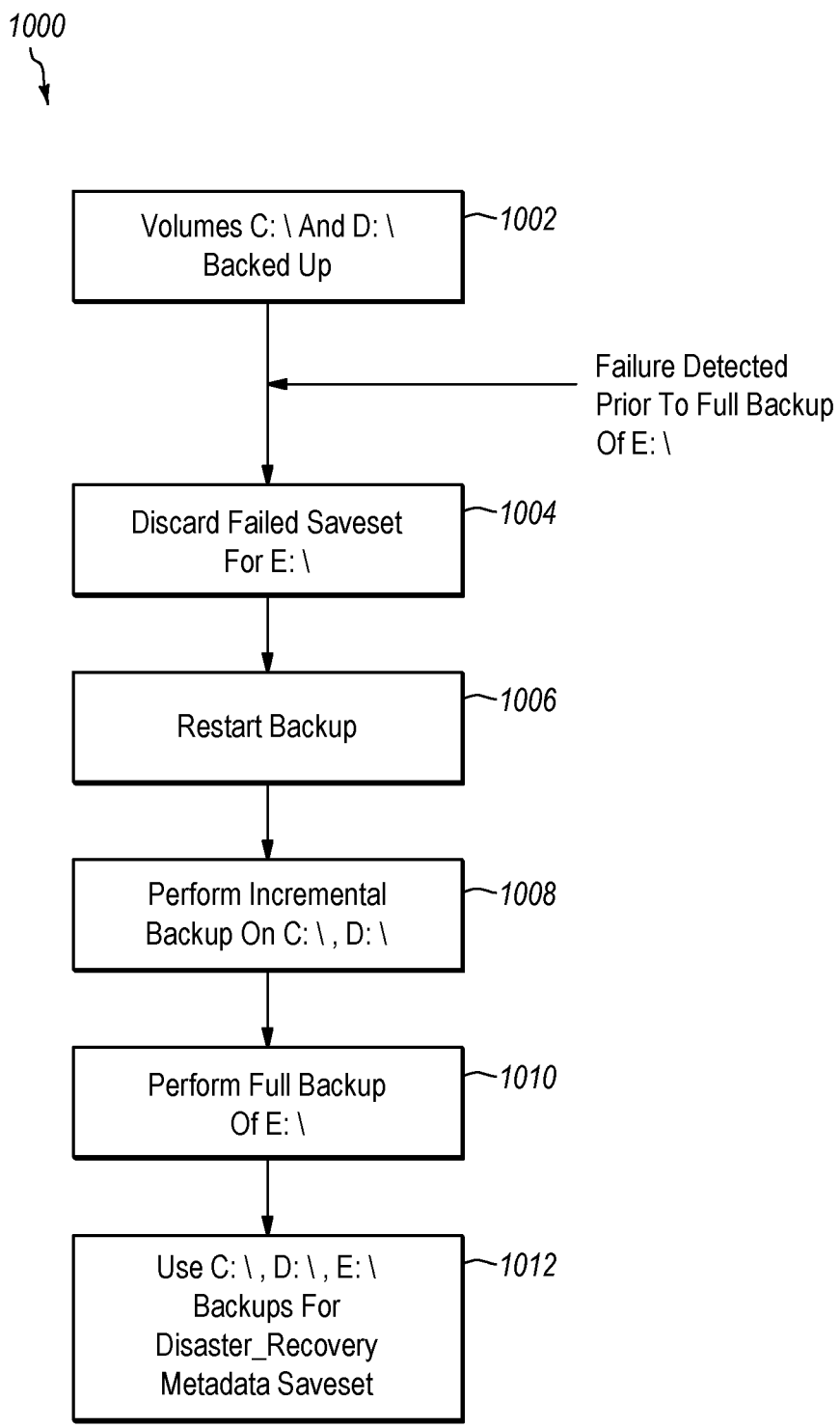
FIG. 8 is a flow diagram disclosing aspects of a time-based CPR applied to non-stream-based backups.

Directing attention to FIG. 8, details are provided concerning a method 1000 reflecting application of CPR in a non-stream-based context. As disclosed elsewhere herein, the advantages for both time-based and path-based CPR may include, among other things, the ability to reuse the partial savesets that were created in the failed attempts. In using the partial savesets, the file index is important in establishing a check point P for the save path. That is, the partial saveset in conjunction with the file index is meaningful only if the backup is stream-based.

However, there are non-stream based backup types such as BBB that do not rely on time-based or path-based checkpoints. For backup types such as these, a path-based check point may not be particularly helpful because partial savesets cannot be used. Thus, in the example method 1000, no path-based checkpoint P is taken. Nonetheless, it can still be worthwhile in these types of backups to reuse the successful savesets in the aggregate when the backup is an aggregate saveset such as ALL or DISASTER_RECOVERY, for example.

With particular attention now to FIG. 8, the method 1000 begins at 1002 where critical volumes C:\ and D:\ are backed up. Before the backup of critical volume E:\ is completed however, a failure is detected. The failed saveset for E:\ is then discarded 1004. The backup is then restarted 1006. Because critical volumes C:\ and D:\ have already been backed up, only an incremental backup of those volumes is performed 1008. Since the failed saveset for E:\ has been discarded, a full backup of E:\ is performed 1010. If the backup is level incremental to start with, the retry for E:\ would be taken with respect to the last successful backup of E:\.

It should be noted that processes 1008 and 1010 can be performed in the reverse of the order indicated in FIG. 8, or at substantially the same time as each other. This notion applies as well to processes 810 and 812 of FIG. 6a.

In any case, the method 1000 then advances to 1012 where the C:\, D:\ and E:\ backups are used for the DISASTER_RECOVERY metadata saveset. While not specifically indicated in FIG. 8, this saveset can then be used to perform a BMR on one or more target machines.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backup management, comprising:
beginning a backup of a set of data that comprises a first volume C: and a second volume D:;
experiencing a failure of the backup after a backup of the first volume C: is completed but before a backup of the second volume D: is completed, such that only a first portion D:\ DirN of the second volume D: is backed up prior to the failure;
creating a first partial saveset for D:\ DirN;
starting a retry of the backup;
creating a snapshot set for the volumes C: and D:;
performing an incremental backup of C: and D:\ DirN;
performing a full backup of that portion of D: that is outside D: \ DirN to create a second partial saveset for D:;
creating a saveset with the volumes C: and D:;
creating a disaster recovery saveset with the saveset;
creating a bare metal recovery (BMR) image by combining the backup of volume C: with the first partial saveset for D:\ DirN and with the second partial saveset for D:; and
restoring a target machine with the BMR image.

2. The method as recited in claim 1, wherein the failure is a transient failure.

3. The method as recited in claim 1, wherein the failed backup is a BMR backup.

4. The method as recited in claim 1, wherein a backup path for the volumes C: and D: is traversed in the same way during retry as during the initial backup attempt.

5. The method as recited in claim 1, wherein the volumes C: and D: are critical volumes of a computing system.

6. The method as recited in claim 1, wherein the method is applied recursively for multiple backup failures.

7. The method as recited in claim 1, further comprising identifying, after creation of the first partial saveset, path and time checkpoints.

8. The method as recited in claim 7, wherein the incremental backup is performed to an 'As Of' time based on the path and time checkpoints.

9. A physical storage device having stored therein computer-executable instructions which, when executed by one or more hardware processors of a computing system, perform the processes of claim 1.

10. A computing device, comprising:
one or more hardware processors; and
the physical storage device of claim 9.

11. A method for backup management, comprising:
performing a backup of a plurality of directories;
experiencing a failure of an emitter;
creating a respective saveset for each of a plurality of dynamic parallel save streams, where each saveset is associated with one or more emitters;
creating a path checkpoint 'P' using the smallest emitter;
creating a time checkpoint 'S' using an earliest savetime of all of the savesets;
starting a retry using the time checkpoint 'S' and the path checkpoint 'P':
identifying one or more items for backup;
sending one or more identified items to a director to be backed up;
generating savesets for the backed up items; and
combining the generated savesets with the savesets of the dynamic parallel save streams to form a global image for all save streams.

12. The method as recited in claim 11, wherein use of the smallest emitter and/or earliest savetime results in a redundant save for a file.

13. The method as recited in claim 11, wherein a scout process is used to identify the one or more items for backup.

14. A physical storage device having stored therein computer-executable instructions which, when executed by one or more hardware processors of a computing system, perform the processes of claim 11.

15. A computing device, comprising:
one or more hardware processors; and
the physical storage device of claim 14.

* * * * *